March 22, 1927.  1,621,816
G. E. THORNE
TEMPERATURE REGULATOR
Filed April 17, 1923
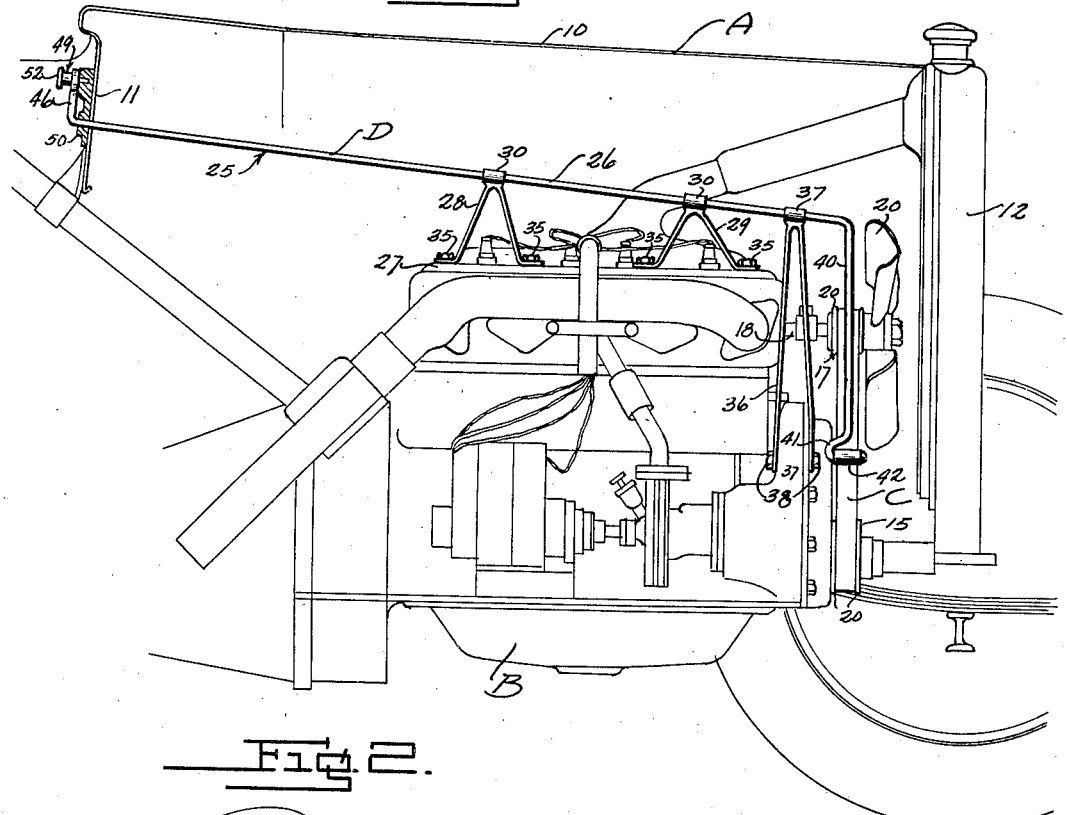
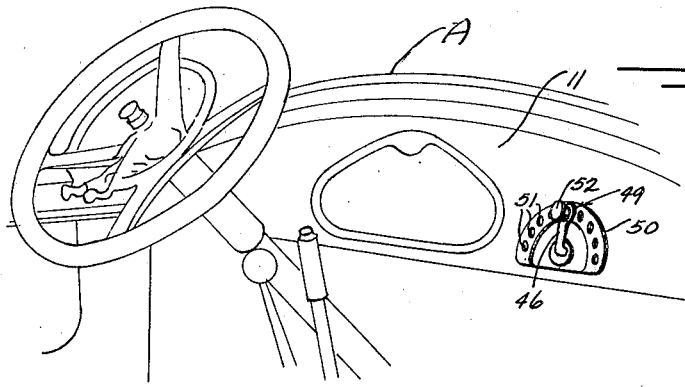
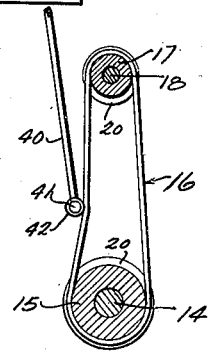
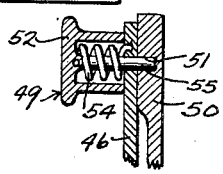
George E. Thorne, Inventor Patented Mar. 22, 1927.

1,621,816

UNITED STATES PATENT OFFICE.

GEORGE E. THORNE, OF TRENTON, NEW JERSEY.

TEMPERATURE REGULATOR.

Application filed April 17, 1923. Serial No. 632,689.

This invention relates to improvements in temperature regulators for internal combustion engines.

The primary object of this invention is the provision of a novel device for use in connection with automotive vehicles, so positioned thereon that the cooling system of the internal combustion engine thereof may be conveniently and accurately regulated from the driver's compartment of the vehicle.

A further object of this invention is the provision of a novel regulating mechanism adapted for accessory use upon automotive vehicles so that the driver at all times may have the cooling system of the vehicle under direct control.

A further object of this invention is the provision of a novel type of regulating mechanism for the cooling fans of automotive vehicles.

Other objects and advantages of this invention will be apparent during the course of the following detailed description.

In the accompanying drawing, forming a part of this specification, and wherein similar reference characters designate corresponding parts throughout the several views:

Figure 1 is a fragmentary view, partly in section, of the forward end of an automotive vehicle, showing the internal combustion engine as associated therewith and the improved regulating mechanism for the cooling system thereof.

Figure 2 is a perspective view of the instrument board or dash of the automotive vehicle, showing more particularly an adjusting mechanism for maintaining the temperature regulating device in a determined position.

Figure 3 is a cross sectional view, showing more particularly the improved regulating mechanism as associated with the driving belt of a cooling fan.

Figure 4 is a fragmentary cross sectional view, showing one type of adjusting mechanism, which may be used upon the instrument board of the automotive vehicle to maintain the desired adjustment of the temperature regulator.

In the drawing, wherein for the purpose of illustration is shown but the preferred embodiment of this invention, the letter A may generally designate a vehicle, having an internal combustion engine B mounted thereon for propelling purposes, which may have associated therewith a cooling device C, such as the fan type. The improved regulating mechanism D is adapted for association with the vehicle A and its internal combustion engine for directly regulating the efficiency of the cooling mechanism C in convenient and accurate manner.

The vehicle A may of course be of any automotive type, preferably including the hood structure 10 and the instrument board 11 facing the driver's compartment, and upon which different control instruments and indicating devices are positioned. The internal combustion engine B may of course be of any preferred type, either with air or water cooling systems. The most general cooling system is that utilizing water as the cooling medium, and in connection with which the radiator 12 is used, as in any approved type of construction. The crank shaft 14 of the internal combustion engine may have a pulley 15 mounted thereon, about which the fan belt 16 may be trained. At its other end, the fan belt 16 is trained over a relatively smaller pulley 17, which may be carried by a stub shaft 18 attached in any approved manner to the housing of the internal combustion engine B.

The pulley 17 is of course directly attached to the fan 20, which in ordinary construction is located just rearwardly of the radiator 12 to create a draft through the radiator for purposes of cooling the water flowing therethrough, as is well understood by those skilled in the art to which this invention pertains. It is preferred that in its normal position, without any engagement by the regulating mechanism D, the belt 16 be positioned slack upon its pulleys 15 and 17, so that when in such position the fan 20 cannot be driven thereby. In order to prevent displacement of the belt 16 when in such slack position, the annular retaining flanges 20 are provided at each side and circumferentially extending outwardly from the pulleys 15 and 17.

Referring to the improved means D, whereby the speed of the cooling fan may be regulated from the driver's compartment of the vehicle, the same preferably includes a substantially L-shaped member 25, which includes a relatively long straight portion 26, in the nature of a shaft, which is rotatably supported above the cylinder head 27 of the internal combustion engine B, as by brackets 28 and 29. This shaft or rod portion 26 may be inclined slightly to the horizontal and is rotatably supported within hollow cylindrical journal boxes 30 of the brackets above mentioned. Each of said brackets 28 and 29 include a pair of legs arranged in V-shaped relation. At their lower ends, these legs are outturned and apertured for engagement with the top surface of the cylinder head 27, and are bolted upon said cylinder head, as by means of the conventional attaching bolt 35 provided upon practically all types of internal combustion engines. The brace member or bearing 28 is relatively higher than the brace member 29, to support the shaft portion 26 of member 25 in its slightly inclined relation above mentioned. A relatively long brace member 36 may be provided immediately forwardly of the internal combustion engine B, which may include a bearing head 37 for oscillatively receiving the shaft portion 26, and includes legs extending in diverging relation for attachment to any suitable part 37 of the internal combustion engine B, as by the conventional bolts 38 provided as a part of the internal combustion engine structure 37.

The member 25 at its forward end is provided with a depending arm 40, which is bent substantially at right angles to the shaft or rod portion 26, and positioned to operate in a horizontal plane, upon rotation or operation of the rod portion 26. At its extreme lower end, the arm portion 40 is preferably bent, as at 41, in order to rotatably receive a roller member 42 of any approved construction, which is adapted for engagement with the exterior of the fan driving belt 16, as will be subsequently set forth.

At its rear end, the shaft portion 26 extends through the instrument board or dash 11, and is bent to provide a right angled crank portion 46, which the operator may grasp to more readily turn the member 25 upon its shaft portion 26 to effect the fan regulating operation. Suitable latch mechanism 49 may be provided upon the dash 11 and the free end of the crank portion 46, so that the regulating mechanism may be held in a determined position for controlling the speed of the fan 20. The latch mechanism 49, by way of example, may include a supporting plate 50 mounted upon the instrument board 11, and provided with a series of socket openings 51 therein, arranged in concentric relation with the axis of the shaft portion 26. A hollow handle or finger engaging knob 52, may be movably supported by the crank portion 46 of the member 25, as by means of a spiral spring 54, so that the same is normally held by tension of said spring into engagement at the free end of the crank portion 46. This finger engaging knob 52 may carry a pin 55 adapted for extension through an aperture at the free end of the rod crank 46, and of sufficient length so that the same may be positioned in any of the socket openings 51 of the wear or supporting plate 50. It is thus obvious that when the operator of the vehicle desires to move the regulating mechanism D for controlling the speed of the fan 20, it will be merely necessary to pull outwardly upon the finger engaging knob 52 against tension of the spring 54, and the pin 55 will be moved from its socket 51 of the supporting plate 50, and the crank 46 will then be free to be swung to any desired adjustment.

The operation of the improved regulating mechanism D is apparent from the foregoing description. It affords a convenient, simple and economical means of having the temperature of the cooling medium under direct regulation at all times. This is a desirable feature, as is well known to users of automotive vehicles. Merely by a slight angular movement of the crank end 46 of the member 25, the roller member 42 carried at the depending end of the arm portion 40 of said member 25 is forced against the fan belt 16, as is illustrated in Figure 3 of the drawing, to tighten the same to any degree whereby the fan 20 may be driven at full speed or any intermediate speed. By moving the member 25 so that the roller 42 thereof is out of engagement with the belt, the fan 20 will not be operated, as above mentioned.

From the foregoing description of this invention, it is obvious that a relatively simple type of regulating device has been provided which can be generally used upon automotive vehicles for regulating the cooling apparatus for the internal combustion engines thereof. It may be installed, as is obvious, without any alternation to the engine or cooling apparatus structures, and affords a very effective means of regulating the cooling apparatus from the driver's compartment. While I am aware that thermostatic regulating devices and some mechanical apparatus has been heretofore provided for regulation of cooling fans, for the most part they are of complicated construction, expensive, and do not afford a practical means of securing the desired regulation. The improved regulating mechanism herein described is preferably adapted for regulating the speed of the fan by operating directly upon the belt, but may use certain novel features of the same in connection with fan regulation by friction clutch devices and the like.

Various changes in the shape, size and arrangement of parts may be made to the form of invention herein shown and described, without departing from the spirit of the invention or the scope of the claims.

I claim:

1. In a temperature regulator for the engines of automobiles the combination with an internal combustion engine including a fan and driving belt therefor, of an operating rod including an elongated straight body portion having a transverse crank offset at one end thereof, means rotatably supporting the elongated body of the operating rod on a fixed axis longitudinally of the internal combustion engine so that upon oscillative movement of said body portion the crank offset will be moved transversely of the internal combustion engine in a plane parallel with the plane of rotation of the fan belt, the crank offset portion at the free end thereof having a roller adapted to engage at the outer surface of the endless belt, the crank offset being disposed entirely outwardly of the confines of said belt, said body portion of the rod being adapted for extension rearwardly along the automobile to the instrument board thereof, and detent means for mounting on the instrument board of the automobile for positively holding the body portion of the rod in any of a number of positions whereby the roller on the crank offset of the rod may engage the external surface of the fan belt with a desired pressure to regulate the efficiency of fan speed or whereby the roller may be entirely lifted free of the fan belt and held in such position.

2. In a temperature regulator for the engines of automotive vehicles, the combination with an internal combustion engine including a fan and a driving belt therefor, of a substantially L-shaped rod including a relatively long shaft portion and an offset end portion, means oscillatively supporting the shaft portion of the rod on a fixed axis longitudinally of the internal combustion engine, with the offset of said rod at the front of the internal combustion engine whereby upon oscillation of the rod upon the axis of said shaft portion the offset portion may be moved in a substantially vertical plane transversely of the longitudinal axis of the internal combustion engine into and out of engagement with the fan driving belt, and means carried on the vehicle, connected with the end of the shaft portion opposite said offset portion for positive and selective adjustment of the rod so that the offset end may engage the fan belt with a desired pressure to regulate the efficiency of the fan speed.

GEORGE E. THORNE.